United States Patent
Dai et al.

(10) Patent No.: US 9,210,418 B2
(45) Date of Patent: Dec. 8, 2015

(54) METHOD AND APPARATUS FOR CALIBRATING MULTI-SPECTRAL SAMPLING SYSTEM

(71) Applicant: Tsinghua University, Beijing (CN)

(72) Inventors: Qionghai Dai, Beijing (CN); Mingjie Zhang, Beijing (CN); Jinli Suo, Beijing (CN)

(73) Assignee: Tsinghua University (CN)

(*) Notice: Subject to any disclaimer, the term of this patent is extended or adjusted under 35 U.S.C. 154(b) by 0 days.

(21) Appl. No.: 14/305,668

(22) Filed: Jun. 16, 2014

(65) Prior Publication Data

US 2015/0085141 A1 Mar. 26, 2015

(30) Foreign Application Priority Data

Sep. 25, 2013 (CN) .......................... 2013 1 0449762

(51) Int. Cl.
*H04N 17/02* (2006.01)
*H04N 17/00* (2006.01)
*G01J 3/28* (2006.01)

(52) U.S. Cl.
CPC ............ *H04N 17/002* (2013.01); *G01J 3/2823* (2013.01); *G01J 2003/2826* (2013.01)

(58) Field of Classification Search
CPC ..... H04N 17/002; H04N 17/02; H04N 17/00; G01J 3/2823; G01J 2003/2826; G01J 3/28

USPC .......... 348/187, 180, 189, 744, 739; 382/162, 382/167; 345/690, 30
IPC .............................................. H04N 17/02,17/00
See application file for complete search history.

(56) References Cited

U.S. PATENT DOCUMENTS

| | | | |
|---|---|---|---|
| 2011/0216971 A1* | 9/2011 | Wang et al. | 382/167 |
| 2012/0075493 A1* | 3/2012 | Singh et al. | 348/222.1 |

* cited by examiner

*Primary Examiner* — Sherrie Hsia
(74) *Attorney, Agent, or Firm* — Lerner, David, Littenberg, Krumholz & Mentlik, LLP

(57) ABSTRACT

A method and an apparatus for calibrating a multi-spectral sampling system are provided. The method includes: sampling scene information of a scene to obtain a two-path multi-spectral image comprising a multi-spectral image consisting of a plurality of sampling points and a RGB color image; calibrating a spectrum of each of the plurality of sampling points to obtain a spatial location thereof and a spectral wavelength corresponding to the spatial location; providing two scanning videos in different scanning directions, demonstrating and shooting the two scanning videos to obtain two two-path multi-spectral videos, in which each two-path multi-spectral video comprises a multi-spectral video and a RGB color video; and based on the spatial location of each of the plurality of sampling points, obtaining a matching point of each of the plurality of sampling points, so as to implement a spatial location calibration of the multi-spectral sampling system.

16 Claims, 2 Drawing Sheets

METHOD AND APPARATUS FOR CALIBRATING MULTI-SPECTRAL SAMPLING SYSTEM

CROSS REFERENCE TO RELATED APPLICATION

This application claims priority and benefits of Chinese Patent Application No. 201310449762.5, filed with State Intellectual Property Office, P. R. C. on Sep. 25, 2013, the entire content of which is incorporated herein by reference.

FIELD

Embodiments of the present disclosure generally relate to a spectral calculation technology field and a computer vision technology field, more particularly, to a method and an apparatus for calibrating a multi-spectral sampling system.

BACKGROUND

Although the imaging technology based on color channels meets the imaging requirements of the human vision system, spectrum information of the scene is lost during the integrating process of the scene light spectrum in the camera sensors. The lost information is the key property for reflecting the physical characteristics of the light source and the scene, and thus it is important to solve the problem of sampling the spectrum information of the scene. Starting from this, many researches on sampling the spectrum information have been performed.

According to different requirements and sampling conditions, the conventional multi-spectral sampling systems comprise a spectrum analyzer, a scanning imaging spectrometer and a single shot imaging spectrometer. All the conventional multi-spectral sampling systems sample the multi-spectral information by compensating the spectral resolution with sacrificing the spatial resolution and time resolution. Thus, how to obtain the scene information having the high spectral resolution, high time solution and high spatial resolution is a problem.

For this, a multi-spectral sampling system which performs a two-path sampling is proposed. Although the multi-spectral information can be sampled well with the above two-path sampling, a precise spatial calibration and spectral calibration cannot be realized.

SUMMARY

Embodiments of the present disclosure seek to solve at least one of the problems existing in the prior art to at least some extent.

For this, one objective of the present disclosure is to provide a method for calibrating a multi-spectral sampling system which can perform a precise spatial calibration and a precise spectral calibration on the multi-spectral sampling system, thus ensuring that the multi-spectral sampling system can sample the multi-spectral information of scene effectively.

Another objective of the present disclosure is to provide an apparatus for calibrating a multi-spectral sampling system.

According to embodiments of a first broad aspect of the present disclosure, a method for calibrating a multi-spectral sampling system is provided. The method includes: sampling scene information of a scene under illumination of a light source by the multi-spectral sampling system to obtain a two-path multi-spectral image, in which the two-path multi-spectral image comprises a multi-spectral image and a RGB color image, and the multi-spectral image consists of a plurality of sampling points; calibrating a spectrum of each of the plurality of sampling points according to multi-spectral information of the multi-spectral image and spectral signatures of the light source, so as to obtain a spatial location of each of the plurality of sampling points and a spectral wavelength corresponding to the spatial location of each of the plurality of sampling points; providing two scanning videos in different scanning directions, demonstrating the two scanning videos by a demonstrating device, and shooting the two scanning videos by the multi-spectral sampling system when the demonstrating device is demonstrating the two scanning videos, so as to obtain two two-path multi-spectral videos, in which each of the two two-path multi-spectral video comprises a multi-spectral video and a RGB color video; and based on the spatial location of each of the plurality of sampling points, obtaining a matching point of each of the plurality of sampling points according to the two two-path multi-spectral videos, so as to implement a spatial location calibration of the multi-spectral sampling system.

With the method for calibrating the multi-spectral sampling system according to embodiments of the present disclosure, a precise spectral calibration can be performed on the multi-spectral sampling system, and spatial locations in the two-path sampling image can be matched precisely, thus ensuring that the multi-spectral sampling system can sample the spectral information of the scene effectively and precisely.

In some embodiments, sampling scene information under a light source by the multi-spectral sampling system to obtain a two-path multi-spectral image includes: illuminating a white screen with the light source and splitting a light ray reflected from the white screen into a first light ray and a second light ray by a beam splitter; sampling the first light ray by a mask, dispersing a sampled light ray by a prism, and shooting dispersed light rays by a gray-scale camera to obtain the multi-spectral image; and shooting the second light ray directly by a RGB camera to obtain the RGB color image.

In some embodiments, sampling scene information under a light source by the multi-spectral sampling system to obtain a two-path multi-spectral image further includes: replacing the prism with a double Amici prism; providing a first lens between the mask and the beam splitter; and providing a second lens between the mask and the double Amici prism.

In some embodiments, the light source is a fluorescent lamp.

In some embodiments, calibrating a spectrum of each of the plurality of sampling points includes: detecting the spatial location of each of the plurality of sampling points; marking a spatial location of a characteristic wavelength of the light source in a spectral band of each of the plurality of sampling points according to the spatial location of each of the plurality of sampling points and the spectral signatures of the light source; and calibrating the spectral band of each of the plurality of sampling points by a B spline curve interpolation method and using the spatial location of the characteristic wavelength as a control point.

In some embodiments, the two scanning videos in different scanning directions includes: a first scanning video, provided with a black background and a pattern of white vertical stripes moving from left to right along with time; and a second scanning video, provided with a black background and a pattern of white transverse stripes moving from top to down along with time.

In some embodiments, the demonstrating device is a liquid crystal display or a projector.

In some embodiments, obtaining a matching point of each of the plurality of sampling points includes: analyzing the multi-spectral video to obtain an alignment time of each of the plurality of sampling points, in which the alignment time of each of the plurality of sampling points is a time when the each of the plurality of sampling points is illuminated; based on characteristics of the two scanning videos, obtaining a corresponding point in a RGB video frame of the RGB color video at the aligning time; and determining the corresponding point as the matching point.

According to embodiments of a second broad aspect of the present disclosure, an apparatus for calibrating a multi-spectral sampling system is provided. The apparatus includes: a light source, configured to illuminate a scene; a two-path multi-spectral sampling module, comprising a first sampling unit and a second sampling unit, wherein the first sampling unit is configured to sample a multi-spectral image of the scene and to obtain multi-spectral information of the multi-spectral image, the second sampling unit is configured to sample a RGB color image of the scene, and the multi-spectral image consists of a plurality of sampling points; a demonstrating device, configured to demonstrate two scanning videos in different scanning directions; a shooting device, configured to shoot the two scanning videos to obtain two two-path multi-spectral videos, wherein each of the two two-path multi-spectral video comprises a multi-spectral video and a RAB color video; and a calibrating module, configured to calibrate a spectrum of each of the plurality of sampling points according to the multi-spectral information of the multi-spectral image and spectral signatures of the light source, and to obtain a matching point of each of the plurality of sampling points according to the two two-path multi-spectral videos, so as to implement a spectrum calibration and a spatial location calibration of the multi-spectral sampling system.

With the apparatus for calibrating the multi-spectral sampling system according to embodiments of the present disclosure, a precise spectral calibration can be performed on the multi-spectral sampling system, and spatial locations in the two-path sampling image can be matched precisely, thus ensuring that the multi-spectral sampling system can sample the spectral information of the scene effectively and precisely.

In some embodiments, the two-path multi-spectral sampling module includes: a beam splitter, configured to split a light ray reflected from the scene into a first light ray and a second light ray; a mask, configured to sample the first light ray to generate a sampled light ray; a prism, configured to disperse the sampled light ray to generate a plurality of dispersed light rays; a gray-scale camera, configured to shoot the plurality of dispersed light rays to obtain the multi-spectral image; and a RGB camera, configured to sample the second light ray to obtain the RGB color image.

In some embodiments, the prism is replaced with a double Amici prism, the two-path multi-spectral sampling module further includes: a first lens, disposed between the mask and the beam-splitter; and a second lens, disposed between the mask and the double Amici prism.

In some embodiments, the demonstrating device includes a projector or a liquid crystal display, a screen and a computer host.

In some embodiments, the light source is a fluorescent lamp.

In some embodiments, the calibrating module is configured to detect the spatial location of each of the plurality of sampling points; mark a spatial location of a characteristic wavelength of the light source in a spectral band of each of the plurality of sampling points according to the spatial location of each of the plurality of sampling points and the spectral signatures of the light source; and calibrate the spectral band of each of the plurality of sampling points by a B spline curve interpolation method and using the spatial location of the characteristic wavelength as a control point.

In some embodiments, the two scanning videos in different scanning directions includes: a first scanning video, provided with a black background and a pattern of white vertical stripes moving from left to right along with time; and a second scanning video, provided with a black background and a pattern of white transverse stripes moving from top to down along with time.

In some embodiments, the calibrating module is further configured to analyze the multi-spectral video to obtain an alignment time of each of the plurality of sampling points, in which the alignment time of each of the plurality of sampling points is a time when the each of the plurality of sampling points is illuminated; obtain a corresponding point in a RGB video frame of the RGB color video at the aligning time, based on characteristics of the two scanning videos; and determine the corresponding point as the matching point.

Additional aspects and advantages of embodiments of present disclosure will be given in part in the following descriptions, become apparent in part from the following descriptions, or be learned from the practice of the embodiments of the present disclosure.

BRIEF DESCRIPTION OF THE DRAWINGS

These and other aspects and advantages of embodiments of the present disclosure will become apparent and more readily appreciated from the following descriptions made with reference to the accompanying drawings, in which.

DETAILED DESCRIPTION

Figure 1:
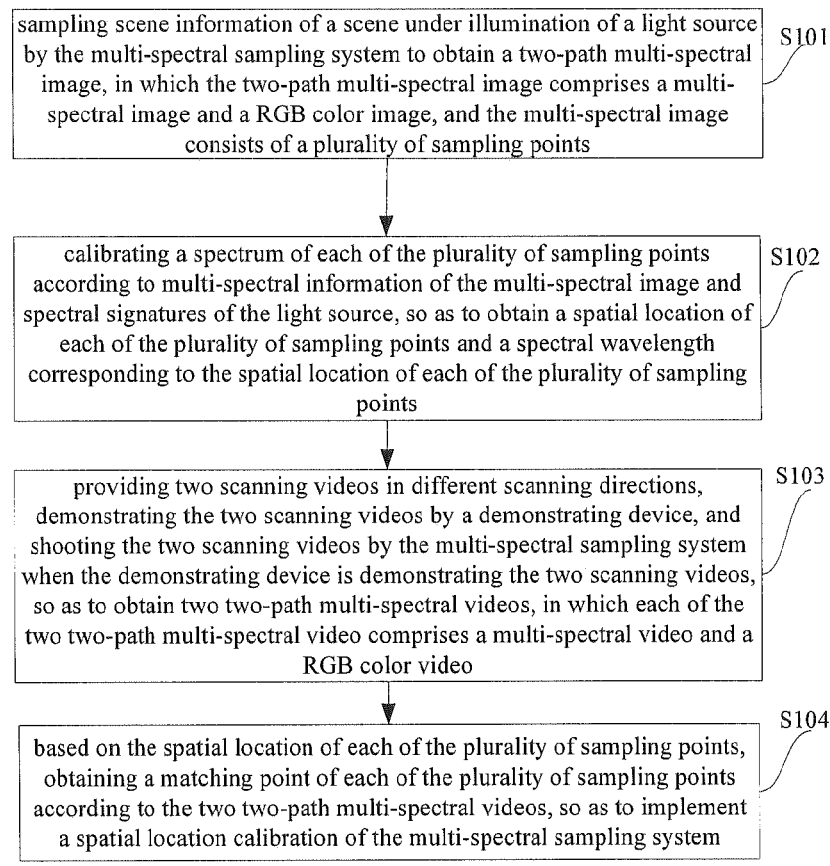
FIG. 1 is a flow chart of a method for calibrating a multi-spectral sampling system according to an embodiment of the present disclosure.

Reference will be made in detail to embodiments of the present disclosure. The same or similar elements and the elements having same or similar functions are denoted by like reference numerals throughout the descriptions. The embodiments described herein with reference to drawings are explanatory, illustrative, and used to generally understand the present disclosure. The embodiments shall not be construed to limit the present disclosure.

In the specification, unless specified or limited otherwise, relative terms such as "central", "longitudinal", "lateral", "front", "rear", "right", "left", "inner", "outer", "lower", "upper", "horizontal", "vertical", "above", "below", "up", "top", "bottom" as well as derivative thereof (e.g., "horizontally", "downwardly", "upwardly", etc.) should be construed to refer to the orientation as then described or as shown in the drawings under discussion. These relative terms are for convenience of description and do not require that the present disclosure be constructed or operated in a particular orientation. In addition, terms such as "first" and "second" are used herein for purposes of description and are not intended to indicate or imply relative importance or significance.

In descriptions of the present disclosure, it should be noted that, unless expressly described otherwise, terms "connected" and "coupled", refer to a relationship in which structures are secured or attached to one another movably, rigidly or integrally, as well as either directly or indirectly through intervening structures, further, "connected" and "coupled" are not restricted to physical or mechanical connections or couplings, unless expressly described otherwise. These having ordinary skills in the art should understand the specific meanings in the present disclosure according to specific situations.

A method and an apparatus for a calibrating a multi-spectral sampling system will be described in details with reference to the drawings.

FIG. 1 is a flow chart of a method for calibrating a multi-spectral sampling system according to an embodiment of the present disclosure.

As shown in FIG. 1, the method for calibrating the multi-spectral sampling system includes the following steps.

At step S101, scene information of a scene under illumination of a light source is sampled by the multi-spectral sampling system to obtain a two-path multi-spectral image, in which the two-path multi-spectral image includes a multi-spectral image and a RGB color image and the multi-spectral image consists of a plurality of sampling points.

Specifically, the scene is illuminated by a standard light source, and the scene is shot by the two-path multi-spectral sampling system to obtain the multi-spectral image having a low spatial resolution and a high spectral resolution and a RGB color image having a high spatial resolution.

In one embodiment of the present disclosure, a fluorescent lamp is used as the light source to illuminate a white screen, and then the light ray reflected from the white screen is split into a first light ray and a second light ray by a beam splitter. The first light ray is sampled by a mask to obtain a sampled light ray, and then the sampled light ray is dispersed by a prism to generate a plurality of dispersed light rays. The plurality of dispersed light rays are shot by a gray-scale camera to obtain the multi-spectral image having the high spectral resolution and the low spatial resolution. In order to compensate the lost spatial resolution caused by sampling, the second light ray is directly shot by a RGB camera to obtain the RGB color image having the high spatial resolution, thus retaining the whole low spectral resolution information of a high resolution scene from the perspective of information transmission.

In another embodiment of the present disclosure, the prism may be replaced with a double Amici prism, a first lens may be provided between the mask and the beam splitter, and a second lens may be provided between the mask and the double Amici prism.

At step S102, a spectrum of each of the plurality of sampling points is calibrated according to multi-spectral information of the multi-spectral image and spectral signatures of the light source, so as to obtain a spatial location of each of the plurality of sampling points and a spectral wavelength corresponding to the spatial location of each of the plurality of sampling points.

Specifically, the spatial location of each of the plurality of sampling points in the multi-spectral image is firstly detected. Then, a spatial location of a characteristic wavelength of the light source is marked according to the spatial location of each of the plurality of sampling points and the spectral signatures of the light source. In one embodiment of the present disclosure, the characteristic wavelengths of the light source are 546.5 nm and 611.6 nm. In other words, according to the feature that the spectrum of the light source has two obvious peaks at the wavelengths of 546.5 nm and 611.6 nm, the multi-spectral image is detected and the spatial locations corresponding to the peaks in the spectrum of each of the plurality of sampling points are marked. Finally, the spectral band of each of the plurality of sampling points is calibrated. Specifically, the two peaks are used as control points, and the spectral band of each of the plurality of sampling points is calibrated by the B spline curve interpolation, such that a spectral wavelength corresponding to each of the plurality of sampling points is obtained.

At step S103, two scanning videos in different scanning directions are provided and demonstrated by a demonstrating device, and the two scanning videos in different scanning directions are shot by the two-path multi-spectral sampling system when the demonstrating device is demonstrating the two scanning videos, so as to obtain two two-path multi-spectral videos. Each two-path multi-spectral video includes a multi-spectral video and a RGB color video.

In one embodiment of the present disclosure, the demonstrating device may be but not limited to a projector or a liquid crystal display. The method for obtaining the two-path multi-spectral videos is obtained by a method similar to the above method for obtaining the two-path multi-spectral image, and will not be described in detail herein.

In embodiments of the present disclosure, the two scanning videos have a same black background, but have regular image stripes scanning in two different directions. The calibration accuracy is closely related with the size of the image strips and the scanning rate. In general, the less the scanning rate is and the smaller the image stripes are, the higher the calibration accuracy is.

Specifically, in one embodiment of the present disclosure, the two scanning videos in different scanning directions include: a first scanning video, provided with the black background and a pattern of white vertical stripes moving from left to right along with time; and a second scanning video, provided with the black background and a pattern of white transverse stripes moving from top to down along with time. Widths and movement speeds of the stripes in the first scanning video and second scanning video can be adjusted independently at any time, so as to be adapted to changes of the parameters and shooting distances of the two-path multi-spectral sampling system, thus ensuring the highest calibration accuracy.

At step S104, based on the spatial location of each of the plurality of sampling points in the multi-spectral image, a matching point of the each of the plurality of sampling points is obtained according to the two two-path multi-spectral videos, so as to implement a spatial location calibration of the multi-spectral sampling system.

Specifically, the multi-spectral video is firstly analyzed to obtain an alignment time of each of the plurality of sampling points. The alignment time of each of the plurality of sampling points is a time when the each of the plurality of sampling points is illuminated. Then, a corresponding point in a RGB color video frame of the RGB color video at the aligning time is obtained based on characteristics of the two scanning videos, and the corresponding point is determined as a matching point. Thus, the spatial location calibration of each of the plurality of sampling points is realized.

More specifically, on the basis of spectral calibration, an average spectral intensity of each sampling point at each moment is calculated according to the multi-spectral video, such that a maximum spectral intensity of each sampling point can be obtained, and then a threshold used for determining whether the sampling point is illuminated or not is obtained from multiplying the maximum spectral intensity by a certain coefficient. Then, the multi-spectral video can be analyzed to find the period $(t_1-t_2)$ in which the spectral intensity of each sampling point reaches the threshold. When the middle moment $(t_1+t_2)/2$ of the period is an integer, it is used as the alignment time of the sampling point. When the middle moment $(t_1+t_2)/2$ of the period is not an integer, the two integer moments adjacent to the middle moment $(t_1+t_2)/2$ are used as the alignment times of each sampling point in different directions, and two RGB images shot at the two alignment times are obtained. Then, the spatial coordinate of the cross point between the transverse trips and the vertical trips is obtained according to the above two RGB images. When the alignment times are two adjacent integers and there are more than one cross point between the transverse trips and the vertical trips, an average value of spatial coordinates of all the cross points is calculated and used as the corresponding spatial coordinate of the sampling point in the RGB color image.

In another embodiment, the alignment time is the time when the spectral intensity of the sampling point reaches the maximum value.

With the method for calibrating the multi-spectral sampling system according to embodiments of the present disclosure, a precise spectral calibration can be performed on the multi-spectral sampling system, and spatial locations in the two-path sampling image can be matched precisely, thus ensuring that the multi-spectral sampling system can sample the spectral information of the scene effectively and precisely.

Figure 2:
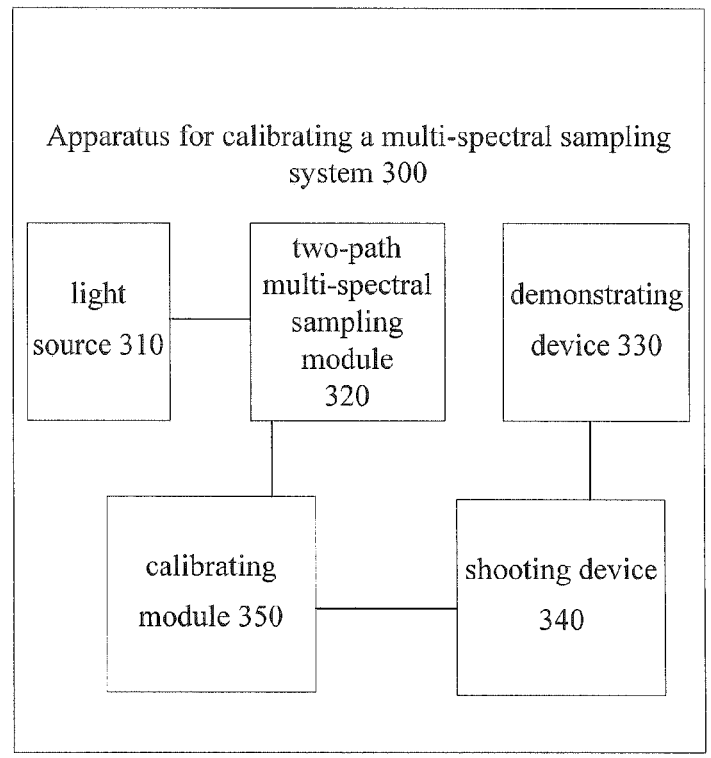
FIG. 2 is a block diagram of an apparatus for calibrating a multi-spectral sampling system according to an embodiment of the present disclosure.

FIG. 2 is a block diagram of an apparatus for calibrating a multi-spectral sampling system according to an embodiment of the present disclosure.

Figure 3:
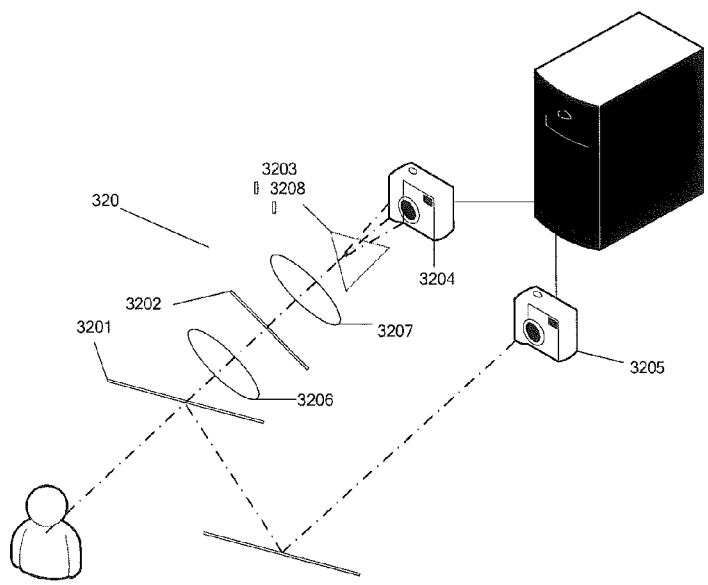
FIG. 3 is a schematic diagram of a two-path multi-spectral sampling module according to an embodiment of the present disclosure.

As shown in FIG. 3, the apparatus 300 for calibrating a multi-spectral sampling system includes a light source 310, a two-path multi-spectral sampling module 320, a demonstrating device 330, a shooting device 340 and a calibrating module 350.

The light source 310 is configured to illuminate a scene. In one embodiment, the light source 310 is a fluorescent lamp.

The two-path multi-spectral sampling module 320 includes a first sampling unit and a second sampling unit (not shown). The first sampling unit is configured to sample the multi-spectral image of the scene and to obtain multi-spectral information of the multi-spectral image. The multi-spectral image consists of a plurality of sampling points. The second sampling unit is configured to sample the RGB color image of the scene.

FIG. 3 is a schematic diagram of the two-path multi-spectral sampling module according to an embodiment of the present disclosure. As shown in FIG. 3, the two-path multi-spectral sampling module 320 includes a beam splitter 3201, a mask 3202, a prism 3203, a gray-scale camera 3204 and a RGB camera 3205.

Specifically, the beam splitter 3201 is configured to split a light ray reflected from the scene into a first light ray and a second light ray. The mask 3202 is configured to sample the first light ray to generate a sampled light ray. The prism 3203 is configured to disperse the sampled light ray to generate a plurality of dispersed light rays. The gray-scale camera 3204 is configured to shoot the plurality of dispersed light rays to obtain the multi-spectral image. The RGB camera 3205 is configured to sample the second light ray to obtain the RGB color image.

In another embodiment of the present disclosure, as shown in FIG. 3, the two-path multi-spectral sampling module 320 may further include a first lens 3206, a second lens 3206 and a double Amici prism 3208. The prism 3203 is replaced with the double Amici prism 3208. The first lens 3206 is disposed between the mask 3202 and the spectroscope 3201, and the second lens 3207 is disposed between the mask 3202 and the double Amici prism 3208.

The demonstrating device 320 is configured to demonstrate two scanning videos in different scanning directions.

In some embodiments of the present disclosure, the demonstrating device 320 includes but is not limited to a projector or a liquid crystal display, a screen and a computer host. The projector or the liquid crystal display projects (displays) the preset regular scanning video on the screen. The computer host is configured to design the scanning video and to control a variety of modules to cooperate with each other when the calibration video is demonstrated.

The calibrating module 350 is configured to calibrate a spectrum of each of the plurality of sampling points according to the multi-spectral information of the multi-spectral image and spectral signatures of the light source, and to obtain a matching point of each of the plurality of sampling points according to the two two-path multi-spectral videos, so as to implement a spectrum calibration and a spatial location calibration of the multi-spectral sampling system.

Specifically, the calibrating module 350 firstly performs a spectrum calibration according to the multi-spectral image. More specifically, the calibrating module 350 calculates the spectrum wavelength of each sampling point according to the feature that the spectrum has two peaks. Then, the calculating module 350 performs a spatial location calibration according to the two scanning videos in two different directions to calibrate the spatial location corresponding to each sampling point. The detailed calibration process is similar to the method described with reference to FIG. 1, and will be omitted herein.

With the apparatus for calibrating the multi-spectral sampling system according to embodiments of the present disclosure, a precise spectral calibration can be performed on the multi-spectral sampling system, and spatial locations in the two-path sampling image can be matched precisely, thus ensuring that the multi-spectral sampling system can sample the spectral information of the scene effectively and precisely.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments can not be construed to limit the present disclosure, and changes, alternatives, and modifications can be made in the embodiments without departing from spirit, principles and scope of the present disclosure.

What is claimed is:

1. A method for calibrating a multi-spectral sampling system, comprising steps of:
   sampling scene information of a scene under illumination of a light source by the multi-spectral sampling system to obtain a two-path multi-spectral image, wherein the two-path multi-spectral image comprises a multi-spectral image and a RGB color image, and the multi-spectral image consists of a plurality of sampling points;

calibrating a spectrum of each of the plurality of sampling points according to multi-spectral information of the multi-spectral image and spectral signatures of the light source, so as to obtain a spatial location of each of the plurality of sampling points and a spectral wavelength corresponding to the spatial location of each of the plurality of sampling points;

providing two scanning videos in different scanning directions, demonstrating the two scanning videos by a demonstrating device, and shooting the two scanning videos by the multi-spectral sampling system when the demonstrating device is demonstrating the two scanning videos, so as to obtain two two-path multi-spectral videos, wherein each of the two two-path multi-spectral video comprises a multi-spectral video and a RGB color video; and based on the spatial location of each of the plurality of sampling points, obtaining a matching point of each of the plurality of sampling points according to the two two-path multi-spectral videos, so as to implement a spatial location calibration of the multi-spectral sampling system.

2. The method according to claim 1, wherein sampling scene information under a light source by the multi-spectral sampling system to obtain a two-path multi-spectral image comprises:

illuminating a white screen with the light source and splitting a light ray reflected from the white screen into a first light ray and a second light ray by a beam splitter;

sampling the first light ray by a mask, dispersing a sampled light ray by a prism, and shooting dispersed light rays by a gray-scale camera to obtain the multi-spectral image; and shooting the second light ray directly by a RGB camera to obtain the RGB color image.

3. The method according to claim 2, wherein sampling scene information under a light source by the multi-spectral sampling system to obtain a two-path multi-spectral image further comprises:

replacing the prism with a double Amici prism;

providing a first lens between the mask and the beam splitter; and providing a second lens between the mask and the double Amici prism.

4. The method according to claim 2, wherein the light source is a fluorescent lamp.

5. The method according to claim 1, wherein calibrating a spectrum of each of the plurality of sampling points comprises:

detecting the spatial location of each of the plurality of sampling points;

marking a spatial location of a characteristic wavelength of the light source in a spectral band of each of the plurality of sampling points according to the spatial location of each of the plurality of sampling points and the spectral signatures of the light source; and calibrating the spectral band of each of the plurality of sampling points by a B spline curve interpolation method and using the spatial location of the characteristic wavelength as a control point.

6. The method according to claim 1, wherein the two scanning videos in different scanning directions comprise:

a first scanning video, provided with a black background and a pattern of white vertical stripes moving from left to right along with time; and a second scanning video, provided with a black background and a pattern of white transverse stripes moving from top to down along with time.

7. The method according to claim 1, wherein the demonstrating device is a liquid crystal display or a projector.

8. The method according to claim 1, wherein obtaining a matching point of each of the plurality of sampling points comprises:

analyzing the multi-spectral video to obtain an alignment time of each of the plurality of sampling points, in which the alignment time of each of the plurality of sampling points is a time when the each of the plurality of sampling points is illuminated;

based on characteristics of the two scanning videos, obtaining a corresponding point in a RGB video frame of the RGB color video at the aligning time; and determining the corresponding point as the matching point.

9. An apparatus for calibrating a multi-spectral sampling system, comprising:

a light source, configured to illuminate a scene;

a two-path multi-spectral sampling module, comprising a first sampling unit and a second sampling unit, wherein the first sampling unit is configured to sample a multi-spectral image of the scene and to obtain multi-spectral information of the multi-spectral image, the second sampling unit is configured to sample a RGB color image of the scene, and the multi-spectral image consists of a plurality of sampling points;

a demonstrating device, configured to demonstrate two scanning videos in different scanning directions;

a shooting device, configured to shoot the two scanning videos to obtain two two-path multi-spectral videos, wherein each of the two two-path multi-spectral video comprises a multi-spectral video and a RAB color video;

a calibrating module, configured to calibrate a spectrum of each of the plurality of sampling points according to the multi-spectral information of the multi-spectral image and spectral signatures of the light source, and to obtain a matching point of each of the plurality of sampling points according to the two two-path multi-spectral videos, so as to implement a spectrum calibration and a spatial location calibration of the multi-spectral sampling system.

10. The apparatus according to claim 9, wherein the two-path multi-spectral sampling module comprises:

a beam splitter, configured to split a light ray reflected from the scene into a first light ray and a second light ray;

a mask, configured to sample the first light ray to generate a sampled light ray;

a prism, configured to disperse the sampled light ray to generate a plurality of dispersed light rays;

a gray-scale camera, configured to shoot the plurality of dispersed light rays to obtain the multi-spectral image; and a RGB camera, configured to sample the second light ray to obtain the RGB color image.

11. The apparatus according to claim 10, wherein the prism is replaced with a double Amici prism, the two-path multi-spectral sampling module further comprises:

a first lens, disposed between the mask and the beam-splitter; and a second lens, disposed between the mask and the double Amici prism.

12. The apparatus according to claim 10, wherein the calibrating module is configured to:
   detect a spatial location of each of the plurality of sampling points;
   mark a spatial location of a characteristic wavelength of the light source in a spectral band of each of the plurality of sampling points according to the spatial location of each of the plurality of sampling points and the spectral signatures of the light source; and
   calibrate the spectral band of each of the plurality of sampling points by a B spline curve interpolation method and using the spatial location of the characteristic wavelength as a control point.

13. The apparatus according to claim 10, wherein the two scanning videos in different scanning directions comprise:
   a first scanning video, provided with a black background and a pattern of white vertical stripes moving from left to right along with time; and
   a second scanning video, provided with a black background and a pattern of white transverse stripes moving from top to down along with time.

14. The apparatus according to claim 10, wherein the calibrating module is further configured to:
   analyze the multi-spectral video to obtain an alignment time of each of the plurality of sampling points, in which the alignment time of each of the plurality of sampling points is a time when the each of the plurality of sampling points is illuminated;
   based on characteristics of the two scanning videos, obtain a corresponding point in a RGB video frame of the RGB color video at the aligning time; and
   determine the corresponding point as the matching point.

15. The apparatus according to claim 9, wherein the demonstrating device comprises a projector or a liquid crystal display, a screen and a computer host.

16. The apparatus according to claim 9, wherein the light source is a fluorescent lamp.

* * * * *